United States Patent
Silicani et al.

(10) Patent No.: US 10,844,219 B2
(45) Date of Patent: Nov. 24, 2020

(54) BODY PLY SKIM COMPOUND

(71) Applicant: BRIDGESTONE CORPORATION, Tokyo (JP)

(72) Inventors: Jose' Antonio Silicani, Rome (IT); Paolo Fiorenza, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 159 days.

(21) Appl. No.: 16/077,253

(22) PCT Filed: Mar. 20, 2017

(86) PCT No.: PCT/EP2017/056550
§ 371 (c)(1),
(2) Date: Aug. 10, 2018

(87) PCT Pub. No.: WO2017/162583
PCT Pub. Date: Sep. 28, 2017

(65) Prior Publication Data
US 2019/0048186 A1    Feb. 14, 2019

(30) Foreign Application Priority Data
Mar. 24, 2016  (IT) .................... 102016000030994

(51) Int. Cl.
*C08L 71/03*  (2006.01)
*C08L 7/00*  (2006.01)
*B60C 1/00*  (2006.01)

(52) U.S. Cl.
CPC ............ *C08L 71/03* (2013.01); *B60C 1/0041* (2013.01); *C08L 7/00* (2013.01)

(58) Field of Classification Search
CPC ........... C08L 71/03; C08L 7/00; B60C 1/0041

USPC ........................................................ 524/445
See application file for complete search history.

(56) References Cited

U.S. PATENT DOCUMENTS 4,624,989 A     11/1986  Berta
5,484,005 A  *  1/1996  Morehart ............. B60C 1/0008
                                                        152/510

FOREIGN PATENT DOCUMENTS

WO      02/36367 A1     5/2002
WO    2014/122622 A1    8/2014

OTHER PUBLICATIONS

Liu et al., "Study on NR/EHR/compatibilizer bend," Xiangjiao Gonye, vol. 42, No. 7, pp. 387-392 (abstract) [retrieved Mar. 12, 2020] . Retrieved from: SciFinder®, Accession No. 1995:847980, CAN 124:31743, CAPLUS. (Year: 1995).*
"Product Guide," Zeon Chemicals, p. 2, [retrieved Mar. 12, 2020]. Retrieved from the Internet: <URL: https://www.zeonchemicals.com/wp-content/uploads/Brochure_ZCLP-Product-Guide_Web_R3_23SEP2019.pdf>. (Year: 2019).*
International Search Report of PCT/EP2017/056550 dated Jul. 3, 2017 (PCT/ISA/210).
Written Opinion of PCT/EP2017/056550 dated Jul. 3, 2017 (PCT/ISA/237).

* cited by examiner

*Primary Examiner* — Josephine L Chang
(74) *Attorney, Agent, or Firm* — Sughrue Mion, PLLC

(57) ABSTRACT

Body ply skim compound comprising a cross-linkable unsaturated chain polymer base, a filler material, a vulcanization system and a polyepihalohydrin rubber. The compound comprises epoxidized natural rubber as a cross-linkable unsaturated chain polymer base and a laminated structure material as a filler material.

8 Claims, No Drawings

BODY PLY SKIM COMPOUND

CROSS REFERENCE TO RELATED APPLICATIONS

This application is a National Stage of International Application No. PCT/EP2017/056550, filed Mar. 20, 2017, claiming priority based on Italian Patent Application No. 102016000030994, filed Mar. 24, 2016.

TECHNICAL FIELD OF THE INVENTION

The present invention relates to a Body Ply Skim compound having impermeability characteristics such as to allow for a drastic reduction in the thickness of the innerliner layer, or even its complete elimination.

BACKGROUND

Here and hereinafter, innerliner layer refers to an inner rubber layer which, insofar as it is substantially impermeable to air, is used in tubeless tyres in order to maintain the pressure of the air within the carcass. Moreover, the innerliner must ensure that oxygen remains as much as possible confined within the carcass and does not spread within the compounds which constitute the other parts of the tyre, thereby leading to degradation phenomena.

Generally, the compounds for the implementation of the innerliner are made with a rubber matrix resulting from an halogenated isobutylene/isoprene copolymer.

As is known, there is a need in the tyre industry to reduce the thickness of the innerliner, but without this affecting its performance in terms of impermeability. In fact, a reduced innerliner layer thickness necessarily translates into a lower quantity of material used, with the obvious advantages that this entails both in terms of productivity and in terms of lower weight for the tyre itself, with positive effects on the overall energy consumption of the vehicle and on the rolling resistance.

SUMMARY OF THE INVENTION

The object of the present invention is to provide a solution that makes it possible to drastically reduce the thickness of the innerliner layer, or else eliminate it entirely, thus obtaining the aforesaid advantages in terms of rolling resistance and in terms of productivity.

In the manufacture of tyres, reinforced plies are used that are made from a thermoplastic material (e.g. nylon, rayon, polyester, aramid) in order to ensure the required standards of strength and durability. The rubber that covers the plies is commonly referred to by the English term "body ply skim". As is known to a person skilled in the art, one of the characteristics that the compound of the body ply skim must meet relates to the high adhesive strength with respect to the plies themselves. In fact, low adhesion of the body ply skim to the ply would necessarily result in a short tyre life.

Reinforced plies are commonly used as reinforcement material in the carcass, and the body ply skim, in relation to the plies of the carcass, is generally in direct contact with the innerliner layer.

The Applicant has surprisingly found that, by modifying the body ply skim compound in an appropriate way, it is possible to confer superior characteristics to the same in terms of impermeability to air together with improved adhesive strength with respect to the reinforced plies. This can drastically reduce the thickness of the innerliner layer, or else eliminate it entirely, insofar as the oxygen impermeability action will be wholly or partially performed by the body ply skim.

The object of the present invention is a body ply skim compound comprising a cross-linkable unsaturated chain polymer base, a filler material and a vulcanization system; said compound being characterized by the fact it comprises: (a) polyepihalohydrin rubber; (b) epoxidized natural rubber as a cross-linkable unsaturated chain polymer base; and (c) a laminated structure material as a filler material.

Here and hereinafter, by vulcanization system is meant to a complex of ingredients comprising at least sulfur and accelerator compounds that in the preparation of the compound are added in a final mixing stage and have the purpose of promoting the vulcanization of the polymer base once the compound is subjected to a vulcanization temperature.

Here and hereinafter, the term "cross-linkable unsaturated chain polymer base" refers to any natural or synthetic non-cross-linked polymer capable of assuming all of the chemical-physical and mechanical characteristics typically assumed by elastomers after cross-linking (vulcanization) with sulfur-based systems.

DETAILED DESCRIPTION OF PREFERRED EMBODIMENTS OF THE INVENTION

Preferably, said cross-linkable unsaturated chain polymer base consists exclusively of epoxidized natural rubber.

Preferably, the polyepihalohydrin rubber is a rubber deriving from the epichlorohydrin homopolymer or from the epichlorohydrin/allyl-glycidyl ether copolymer or from epichlorohydrin/ethylene oxide copolymer or from the epichlorohydrin/ethylene oxide/allyl-glycidyl ether terpolymer.

Preferably, said laminated structure material has a diameter of between 0.2 and 2 mm and an aspect ratio of between 5 and 30, preferably between 8 and 20.

Preferably, said laminated structure material is comprised within the group made up of kaolin, clay, silica, feldspar, mica, graphite, bentonite and alumina.

Preferably, said body ply skim compound comprises from 30 to 50 phr of epoxidized natural rubber, from 50 to 70 phr polyepihalohydrin rubber and from 40 to 60 phr of said laminated structure material.

Another object of the present invention is a body ply skim portion being made with the compound of the present invention.

Another object of the present invention is a tyre comprising a body ply skim portion being made with the compound of the present invention.

For a better understanding of the invention, the following examples are used for illustrative and non-limiting purposes.

EXAMPLES

Six compounds were made, two according to the dictates of the present invention (A and B) and four as comparison compounds (Comp.1-4). The compounds made according to the present invention (A and B) differ in the relative amounts of epoxidized natural rubber and polyepihalohydrin rubber. The four comparison compounds (Comp.1-4) differ as follows: a first comparison compound (Comp.1) that represents a type of compound which is generally used for preparing innerliner layers; a second compound (Comp.2) that represents a type of compound commonly used in the preparation of body ply skim; a third compound (Comp.3) that differs from the second compound Comp.2 only in the substitution of the natural rubber with epoxidized natural rubber; a fourth compound (Comp.4) that differs from the third compound Comp.3 in the presence within the polymer base of polyepihalohydrin rubber in place of the SBR rubber.

The purpose of the comparison compounds Comp.1 and Comp.2 is to verify whether the body ply skim compounds, which are object of the present invention, have characteristics of oxygen impermeability and adhesion to the plies that are comparable to those of an innerliner layer and a body ply skim layer respectively.

The purpose of the comparison compounds Comp.3 and Comp.4 is to verify the existence of a synergistic effect between the epoxidized natural rubber, the polyepihalohydrin rubber and the material having a laminated structure.

Preparation of the Compounds

The compounds were made according to the standard procedure described below, which is not relevant to the present invention.

(1$^{st}$ Mixing Step)

Before the start of the mixing, a mixer with tangential rotors (commonly called Banbury) and an internal volume of between 230 and 270 liters was loaded with the polymer bases, the reinforcing filler and the filler material, reaching a fill factor of between 66 and 72%.

The mixer was operated at a speed of 40-60 rpm, and the mixture thus formed was removed once a temperature of 140-160° C. had been reached.

(2$^{nd}$ Mixing Step)

The vulcanization system was added to the mixture obtained from the previous step, reaching a fill factor of 63-67%.

The mixer was operated at a speed of 20-40 rpm, and the mixture thus formed was removed once a temperature of 100-110° C. had been reached.

Composition of the Compounds

Table I shows the compositions in phr of the six compounds described above.

TABLE I

|  | Comp.1 | Comp.2 | Comp.3 | Comp.4 | A | B |
|---|---|---|---|---|---|---|
| SBR | — | 35.0 | 35.0 | — | — | — |
| Br-IIR | 80.0 | — | — | — | — | — |
| NR | 20.0 | 65.0 | — | — | — | — |
| E-NR | — | — | 65.0 | 65.0 | 65.0 | 35.0 |
| Polyepihalohydrin rubber | — | — | — | 35.0 | 35.0 | 65.0 |
| CB | 50.0 | 40.0 | 40.0 | 40.0 | 40.0 | 40.0 |
| CaCO3 | 40.0 | — | — | — | — | — |
| Laminated clay | — | — | — | — | 50.0 | 50.0 |
| Sulfur | 1.0 | 2.0 | 2.0 | 2.0 | 2.0 | 2.0 |
| MBTS | 1.5 | 0.2 | 0.2 | 0.2 | 0.2 | 0.2 |
| TBBS | — | 0.8 | 0.8 | 0.8 | 0.8 | 0.8 |

SBR is a polymer base obtained by means of a polymerization process in an emulsion or in a solution with a styrene content between 20 to 45% and an oil content between 0 and 30%.
BR-IIR stands for bromobutyl rubber.
NR stands for natural rubber that is made of a polymer base composed of natural origin cis-1,4-polyisoprene.
E-NR stands for epoxidized natural rubber, presenting a degree of epoxidation of 25%.
The polyepihalohydrin rubber used is a rubber derived from the epichlorohydrin/ethylene oxide/allyl-glycidyl ether terpolymer marketed as T3000 by the company ZEON.
CB stands for carbon black belonging to the class N6.
The laminated clay used is a mineral filler produced and marketed by BASF as ASP ® NC X-1.
MBTS stands for mercaptobenzothiazole-disulfide.
TBBS is the acronym for N-tert-butyl-2-benzothiazole sulfenamide used as a vulcanization accelerator.

Laboratory Test Results

The compounds described above were subjected to tests in order to evaluate the properties thereof, both in terms of adhesion towards the reinforcing plies and in terms of oxygen impermeability.

The oxygen impermeability test was performed on materials with a thickness of 0.7 mm and using a conventional apparatus as MOCON® OX-TRA® (model 2/61). The measurements were performed at a temperature of 25° C.

For easier interpretation of the results obtained, in Table II, the oxygen impermeability values are given in a form that is indexed with reference to the results of the comparison compound generally used for the implementation of an innerliner layer (Comp.1). The lower the indexed value, the greater the oxygen impermeability.

The adhesion of the compounds to the reinforced ply was estimated as a percentage of the ply that was still covered with rubber following the separation of the two parts of the ply-rubber compound by application of a load. The ply used in the text is made of PET.

For easier interpretation of the results obtained, in Table II, the adhesion values are given in indexed form with reference to the results of the compound that is the object of the invention, (Compound B). The greater the indexed value, the greater the measured adhesion.

The ply-rubber adhesion value for the comparison compound Comp.1 is not reported, insofar as the same—relating to an innerliner layer and not a body ply skim layer—does not possess this characteristic.

TABLE II

|  | Comp.1 | Comp.2 | Comp.3 | Comp.4 | A | B |
|---|---|---|---|---|---|---|
| Ply-rubber adhesion | — | 55 | 55 | 85 | 100 | 100 |
| Oxygen impermeability | 100 | 720 | 340 | 212 | 130 | 108 |

As can be seen from the data reported in Table II, the compounds that are the object of the present invention have oxygen impermeability values that are comparable to those of an innerliner compound (Comp.1) while, at the same time, they have adhesion values (covering) that are by far greater than those of a compound (Comp.2) commonly used in the preparation of a body ply skim portion.

In other words, the compounds of the present invention have the great advantage of being able to implement body ply skim portions that not only have oxygen impermeability comparable to that of an innerliner, but that unexpectedly also have high adhesion to the reinforcing plies.

This will make it possible to greatly reduce the thickness of the innerliner, nevertheless guaranteeing the necessary oxygen impermeability for said oxygen not to spread within the other parts of the tyre, thereby causing the known degradation phenomenon thereto.

The values of Table II relating to the comparison compounds Comp.3 and Comp.4 show that the presence of epoxidized natural rubber only or the combination of epoxidized rubber and of polyepihalohydrin rubber only are not able to ensure the benefits of the compounds of the invention.

Finally, a further advantage of the invention is the fact that the polyepihalohydrin rubber can be produced from renewable sources. In fact, processes have recently been implemented that can produce epichlorohydrin from vegetable origin glycerol. In this way, therefore, it will be possible to implement body ply skim portions with a significantly lower environmental impact than those of the known art.

The invention claimed is:
1. A body ply skim compound comprising a cross-linkable unsaturated chain polymer base, a filler material and a vulcanization system; said compound being characterized by comprising: (a) polyepihalohydrin rubber; (b) epoxidized natural rubber as the cross-linkable unsaturated chain polymer base; and (c) a laminated structure material as a filler material; and said compound being characterized in that said cross-linkable unsaturated chain polymer base consists exclusively of epoxidized natural rubber.

2. The body ply skim compound according to claim 1, characterized in that said polyepihalohydrin rubber is a rubber deriving from epichlorohydrin homopolymer, from epichlorohydrin/allyl-glycidyl ether copolymer, from epichlorohydrin/ethylene oxide copolymer or from epichlorohydrin/ethylene oxide/allyl-glycidyl ether terpolymer.

3. The body ply skim compound according to claim 1, characterized in that said laminated structure material has a diameter between 0.2 and 2 mm and an aspect ratio between 5 and 30.

4. The body ply skim compound according to claim 3, characterized in that said laminated structure material has an aspect ratio between 8 and 20.

5. The body ply skim compound according to claim 1, characterized in that said laminated structure material is comprised within the group made up of kaolin, clay, mica, feldspar, silica, graphite, bentonite and alumina.

6. The body ply skim compound according to claim 1, characterized by comprising from 30 to 50 phr of epoxidized natural rubber, from 50 to 70 phr of polyepihalohydrin rubber and from 40 to 60 phr of said laminated structure material.

7. A body ply skim portion, characterized in that it is made with the compound according to claim 1.

8. A tire characterized by comprising a body ply skim portion according to claim 7.

* * * * *